United States Patent
Funakoshi et al.

(10) Patent No.: US 6,876,397 B2
(45) Date of Patent: *Apr. 5, 2005

(54) MENU DISPLAY APPARATUS

(75) Inventors: Hideaki Funakoshi, Osaka (JP);
Koshiro Itakura, Osaka (JP)

(73) Assignee: Funai Electric Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 123 days.

(21) Appl. No.: 09/223,122

(22) Filed: Dec. 30, 1998

(65) Prior Publication Data

US 2002/0060749 A1 May 23, 2002

(51) Int. Cl.⁷ .......................... H04N 5/445; H04N 5/50; G09G 5/26; G09G 5/00
(52) U.S. Cl. .................... 348/569; 345/472.2; 345/671
(58) Field of Search .................................. 348/563, 569, 348/570, 906, 564; 345/352, 353, 354, 357, 156, 204, 472.2, 671, 800, 815; 725/39

(56) References Cited

U.S. PATENT DOCUMENTS

| | | | | |
|---|---|---|---|---|
| 4,626,892 A | | 12/1986 | Nortrup et al. ............... 358/21 |
| 4,641,205 A | | 2/1987 | Beyers, Jr. ................... 358/335 |
| 5,434,626 A | | 7/1995 | Hayashi et al. ............. 348/569 |
| 5,528,304 A | * | 6/1996 | Cherrick et al. ............ 348/565 |
| 5,729,251 A | * | 3/1998 | Nakashima .............. 395/200.2 |
| 5,731,805 A | * | 3/1998 | Tognazzini et al. .......... 345/156 |
| 5,912,668 A | * | 6/1999 | Sciammarella et al. ..... 345/348 |
| 5,926,178 A | * | 7/1999 | Kurtenbach .................. 345/352 |
| 5,929,932 A | * | 7/1999 | Otsuki et al. ............... 348/569 |
| 5,969,769 A | * | 10/1999 | Hamadate .................... 348/563 |
| 5,973,682 A | * | 10/1999 | Saib et al. ................... 345/327 |
| 6,011,546 A | * | 1/2000 | Bertran ....................... 348/563 |
| 6,049,328 A | * | 4/2000 | Vanderheiden ............... 345/173 |
| 6,072,483 A | * | 6/2000 | Rosin et al. ................. 345/352 |
| 6,075,575 A | * | 6/2000 | Schein et al. ............... 348/569 |
| 6,128,009 A | * | 10/2000 | Ohkura et al. .............. 348/563 |
| 6,179,487 B1 | * | 1/2001 | Bardon et al. .............. 345/353 |
| 6,201,540 B1 | * | 3/2001 | Gallup et al. ............... 345/339 |
| 6,208,340 B1 | * | 3/2001 | Amin et al. ................. 345/339 |
| 6,211,921 B1 | * | 4/2001 | Cherian et al. ............. 348/565 |
| 6,437,758 B1 | * | 8/2002 | Nielsen et al. ................. 345/8 |

* cited by examiner

*Primary Examiner*—Brian Yenke
(74) *Attorney, Agent, or Firm*—Myron Greenspan, Esq.; Lackenbach Siegel, LLP

(57) ABSTRACT

A menu display apparatus including a selection unit for inputting data for selecting an arbitrary one of a plurality of menu items respectively assigned with numbers which are displayed on a screen of a display unit, and a display control unit for displaying on the screen the number corresponding to the menu item selected by the selection unit.

14 Claims, 8 Drawing Sheets

FIG. 11

= RESERVATION SET =

RESERVATION NUMBER —

CHANNEL NUMBER —

— YEAR — MONTH — DAY — DAY OF WEEK

START — HOUR — MINUTE

END — HOUR — MINUTE

FIG. 12

= RESERVATION SET =

RESERVATION NUMBER 1

CHANNEL NUMBER —

— YEAR — MONTH — DAY — DAY OF WEEK

START — HOUR — MINUTE

END — HOUR — MINUTE

MENU DISPLAY APPARATUS

BACKGROUND OF THE INVENTION

1. Field of the Invention

The present invention relates to a menu display apparatus for displaying menu items on a screen and, more particularly to a menu display apparatus such as a television receiver, a personal computer having a display means such as a liquid crystal display (LCD) or the like which is provided with a function of displaying a plurality of setting items on a screen.

2. Description of the Related Art

A display apparatus such as a television receiver, a personal computer or the like displays letters of a plurality of menu items on a screen of a cathode ray tube (CRT), an LCD or the like. Such a display apparatus employs a method in which, in order to distinguish a menu item selected by a user by using a selection means such as a remote controller or the like from other menu items not selected, only the selected menu item is displayed in half-tone brightness or a different color.

Such a method is disclosed in U.S. Pat. No. 5,434,626, for example.

Further, there has been proposed a method in which, in order to facilitate the selecting operation at the time of selecting one menu item among a plurality of menu items, the plurality of menu items are assigned with different numbers respectively and an arbitrary number (that is, an arbitrary menu item) is selected by pushing a numerical key of a remote controller corresponding to the arbitrary menu item. Such a method is disclosed in U.S. Pat. Nos. 4,626,892 and 4,641,205.

Further, in a case where a scene adapted to input numerical values is displayed as shown in FIG. 14, there has been proposed a technique in which a short bar b is displayed and blinked at a position adjacent to an item to be inputted so as to urge a user to input a numerical value at the position.

However, of the aforesaid conventional methods, the method of displaying the selected menu item in a different color so as to distinguish it from other menu items has a drawback that this method can not be employed at all in the case where the display means (CRT or LCD) used for display the menu items is not a color display means. Further, the aforesaid method of displaying the selected menu item in half-tone brightness has a drawback that it is difficult for a user to distinguish the selected item when the display means used for display the menu items is not a color display means.

The aforesaid method of selecting an arbitrary menu item by pushing a corresponding numerical key of a remote controller disclosed in U.S. Pat. No. 4,626,892 is inconvenient in its usage in a manner that, since there is no means for displaying the number of the numerical key corresponding to the menu item selected by a user, the user can not confirm an erroneous pushing operation when the user erroneously pushes a numerical key which does not correspond to the menu item selected by the user.

Furthermore, the aforesaid method of blinking the short bar b at a position adjacent to an item to be inputted as shown in FIG. 14 has a drawback that it is difficult to distinguish the bar since it is short in size and hence difficult to perform the setting operation of the item.

SUMMARY OF THE INVENTION

The present invention has been made in view of the aforesaid problems and an object of the present invention is to provide a menu display apparatus which is good in operability and in which a menu item selected by a user can be distinguished from other menu items quite easily even in a case where a display means is not a color display means.

Another object of the present invention is to provide a menu display apparatus which is good in operability, in particular, for a user such as a visually handicapped person, an aged person or the like who is handicapped at the time of discriminating letters displayed on a screen.

In order to achieve the above object, the invention provides a menu display apparatus comprising: selection means for inputting data for selecting an arbitrary one of a plurality of menu items respectively assigned with numbers which are displayed on a screen of display means; and display control means for displaying on the screen the number corresponding to the menu item selected by the selection means.

Further, the invention provides a menu display apparatus comprising: selection means for inputting data for selecting an arbitrary one of a plurality of menu items which are displayed on a screen of display means; and display control means for changing a size or a shape of display letters of the menu item selected by the selection means within a scene displayed on the screen.

Furthermore, the invention provides a menu display apparatus comprising: selection means for inputting data for selecting an arbitrary one of a plurality of menu items which are displayed on a screen of display means; and display control means for displaying on the screen a sign indicating the menu item selected by the selection means at a position separated from a display position of the menu items in a size larger than that of display letters of the menu items.

BRIEF DESCRIPTION OF THE DRAWINGS

FIG. 11 is a diagram showing an example of a screen wherein letters of an input item itself are displayed in an enlarged size in the another embodiment;

FIG. 12 is a diagram showing an example of a screen wherein letters of another input item itself are displayed in an enlarged size in the another embodiment;

DETAILED DESCRIPTION OF THE PREFERRED EMBODIMENTS

Embodiments of the present invention will be described with reference to the accompanying drawings.

Figure 1:
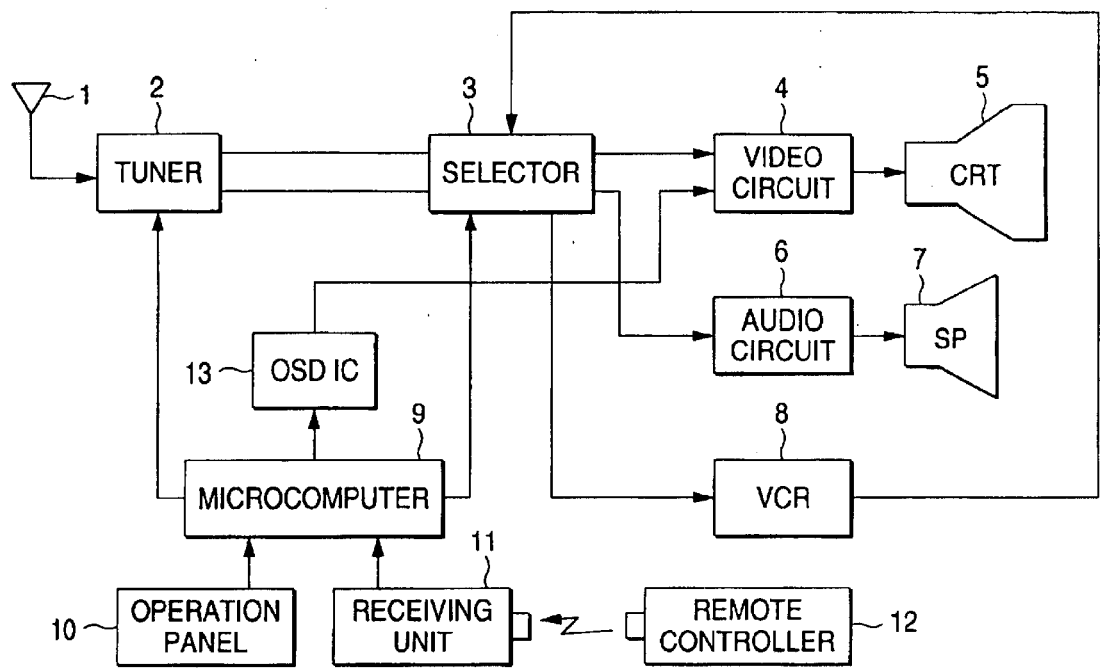
FIG. 1 is a block diagram showing a video cassette recorder integrally provided with a television set (TVCR) to which a menu display apparatus according to an embodiment of the present invention is applied.

FIG. 1 is an electrical block diagram showing a video cassette recorder integrally provided with a television set (TVCR) to which a menu display apparatus according to the present invention is applied. This TVCR is not changed in the design of the hardware thereof at all as compared with a general TVCR but changed in a part of the software of a microcomputer 9 thereof so as to perform the function of the menu display apparatus.

Figure 2:
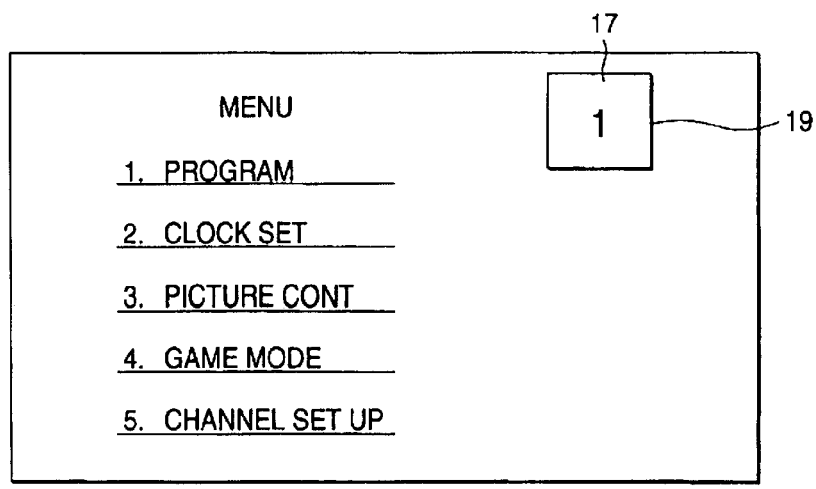
FIG. 2 is an explanatory diagram showing an initial menu scene displayed on a screen of the menu display apparatus according to the embodiment.
Figure 13:
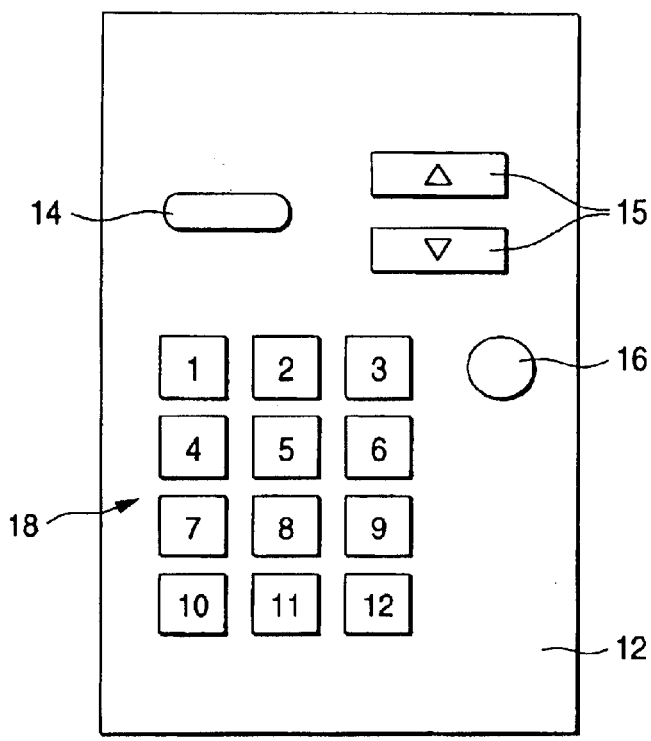
FIG. 13 is a front view showing an example of a remote controller.
Figure 14:
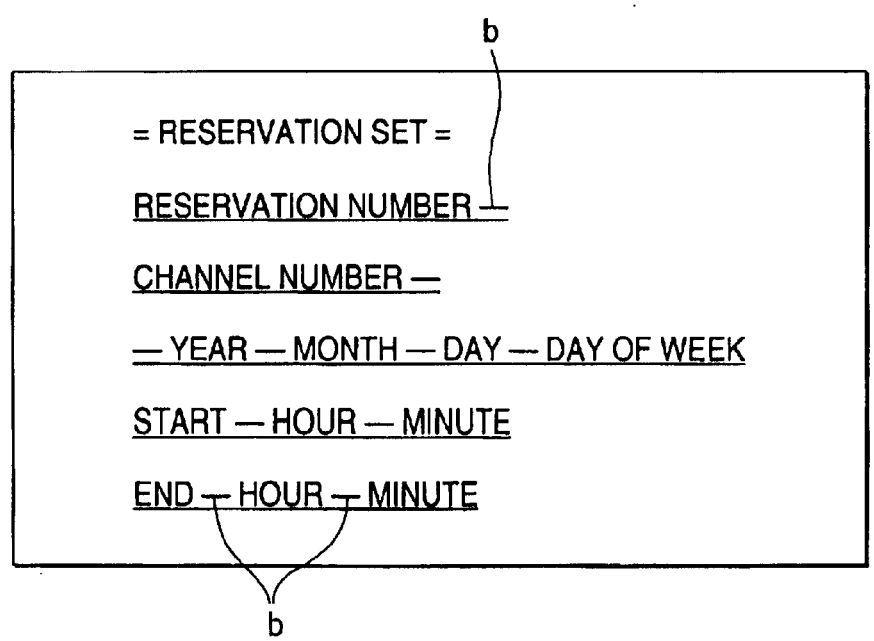
FIG. 14 is a diagram for explaining menus displayed on a screen of a conventional menu display apparatus.

That is, when a menu key 14 contained in the operation keys of a remote controller 12 shown in FIG. 13 or the like is pushed, a menu scene as shown in FIG. 2 in which menu items respectively assigned with different numbers are listed in a column is displayed on a CRT 5 which is a display means. When up/down keys 15 (corresponding to a selection means) and a selection key 16 (corresponding to a determination mean) provided as operation keys are pushed thereby to select arbitrary one of the menu items, the menu number corresponding to the selected menu item is displayed within the screen of the CRT 5 as shown by reference numeral 17. In FIG. 13, reference numeral 18 designates numerical keys serving as the operation keys.

The arrangements of the respective portions of the TVCR shown in FIG. 1 will be described below.

In this TVCR, the signal received by an antenna 1 is supplied to a tuner 2. The tuner 2 selects a channel in accordance with a control signal from the microcomputer 9.

The microcomputer 9 is provided in order to control the TVCR. The output port of the microcomputer 9 is connected to the tuner 2, a selector 3, an OSD IC 13 and the like, and the input port thereof is connected to an operation panel 10 and a receiving unit 11 for receiving an optical signal from the remote controller 12. The output signal from the tuner 2 is sent to a video circuit 4, an audio circuit 6 and a video cassette recorder (VCR) 8 through the selector 3 which operates in accordance with a control signal from the microcomputer 9.

That is, when the VCR 8 is in an off-state, a video signal is outputted to the CRT 5 through the video circuit 4 and an audio signal is outputted to a speaker (SP) 7 through the audio circuit 6. In contrast, when the VCR 8 is in an on-state and in a recording mode, both the video signal and the audio signal are recorded in the VCR 8. When the VCR 8 is in the on-state and in a reproducing mode, a video signal and an audio signal reproduced from the VCR 8 are outputted to the video circuit 4 and the audio circuit 6 through the selector 3, respectively.

The video circuit 4 is supplied with a signal outputted from the OSD IC 13 in addition to the video signal outputted from the selector 3. The OSD IC 13 is a general-purpose integrated circuit and is arranged to generate character data of letters, figures, symbols and the like forming the menu scene in accordance with a command signal outputted from the microcomputer 9. The microcomputer 9 and the OSD IC 13 form a display control means.

Next, the operation of the menu display apparatus will be described.

When a user pushes the menu key 14 contained in the operation keys of the remote controller 12 (or the operation panel 10), the corresponding data is sent to the microcomputer 9. Then, the microcomputer 9 shifts the operation mode to a menu selection mode and hence executes the program processing shown by the flow chart of FIG. 3.

First, the microcomputer 9 supplies a command signal to the OSD IC 13 thereby to display the menu scene on the screen (step S11). FIG. 2 shows an initial menu scene displayed on the screen of the CRT 5.

In this case, as the menu items, there are PROGRAM (predetermined program), CLOCK SET (time adjustment), PICTURE CONT (picture quality control), GAME MODE (game program) and CHANNEL SETUP (setup of channel). Numbers "1" to "5" are assigned to the menu items indicated in English, respectively. Within a window 19 at the upper right portion of the screen, there is displayed in a large size the menu number selected by the user by operating the up/down keys (selection means). At the initial state, the menu number "1" is displayed.

Thereafter, it is determined whether or not the data has been inputted from the up/down key 15 (corresponding to the selection means) of the remote controller 12 (or the operation panel 10) (step S12). When the up/down key 15 is pushed, the microcomputer 9 supplies the command to the OSD IC 13 thereby to cyclically change the number within the window 19 contained in the initial menu scene in a range of "1" to "5" (step S13). In this case, the menu number displayed at the upper right portion of the screen increases at every pushing of the up/down key 15 to the down direction. That is, since the number "1" is displayed at the initial state, the menu number is changed from "1" to "2" when the down key 15 is pushed once, while the menu number is changed from "1" to "5" when the up key 15 is pushed once.

Subsequently, it is determined whether or not the selection key 16 (corresponding to the determination means) of the remote controller 12 (or the operation panel 10) has been pushed (step S14).

When it is determined that the selection key 16 has not been pushed, the process returns to step S12. In contrast, when it is determined that the selection key 16 has been pushed, the selection of the menu item corresponding to the menu number displayed within the window 19 of the menu scene at this time point is determined (step S15).

Figure 3:
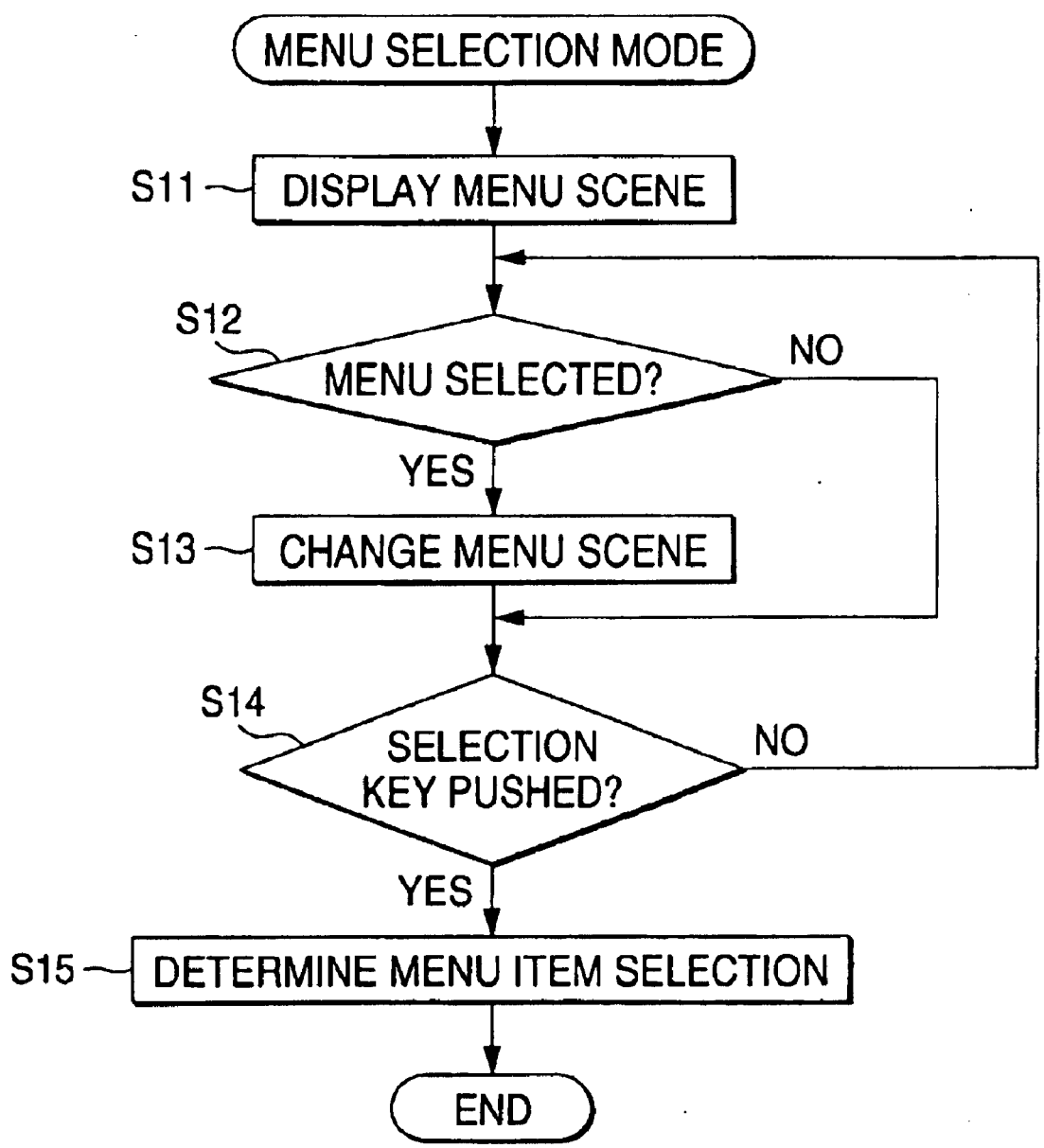
FIG. 3 is a flow chart for explaining the menu display operation of the menu display apparatus according to the embodiment.

Then, the menu selection mode is cancelled and the program processing shown in FIG. 3 is terminated. Thereafter, the program processing of the menu item thus determined in the menu selection is executed (corresponding to a control means).

For example, when the selection key 16 is pushed in a state where the number "2" is displayed within the window 19 on the screen of the CRT 5, the program processing for the CLOCK SET (time adjustment) is executed. When the selection key 16 is pushed without touching the up/down keys 15 after being shifted to the menu selection mode, since the menu scene is in the initial state and hence the number "1" is displayed within the window 19, the program processing for the PROGRAM (predetermined program) corresponding to the menu item of the menu number "1" is executed.

Figure 4:
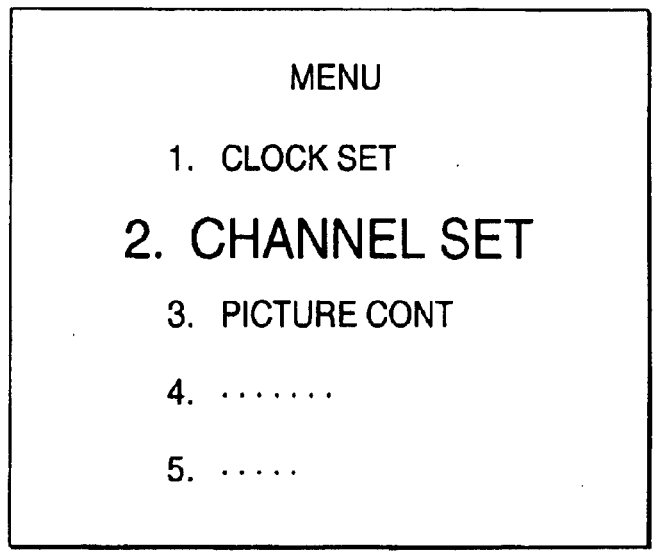
FIG. 4 is a diagram showing an example of a screen wherein letters of a menu item are displayed in an enlarged size in the embodiment.

While the embodiment is arranged to display the menu number "1" to "5" within the window 19 on the screen of the CRT 5, the present invention is not limited thereto and may be modified not to provide the window 19. Further, the present invention may be modified in a manner that, instead of displaying the menu number "1" to "5", the letters of the selected menu item itself are changed, for example, enlarged in their display sizes as shown in FIG. 4. Such a modification can be realized by merely changing the contents of the command supplied from the microcomputer 9 to the OSD IC 13.

For example, when the up/down key 15 is pushed once in a state where the initial menu scene is displayed on the screen of the CRT 5, only the letters of "1. CLOCK SET" are displayed in a double size. In this state, when the selection key 16 is pushed, the program processing of the CLOCK SET (time adjustment) which is the menu item corresponding to the menu number "1" is executed in the same manner as described above. When the up/down key 15 is further pushed without pushing the selection key 16, the letters of "1. CLOCK SET" are restored in the normal size, and only the letters of "2. CHANNEL SET" are displayed in a double size as shown in FIG. 4.

Figure 5:
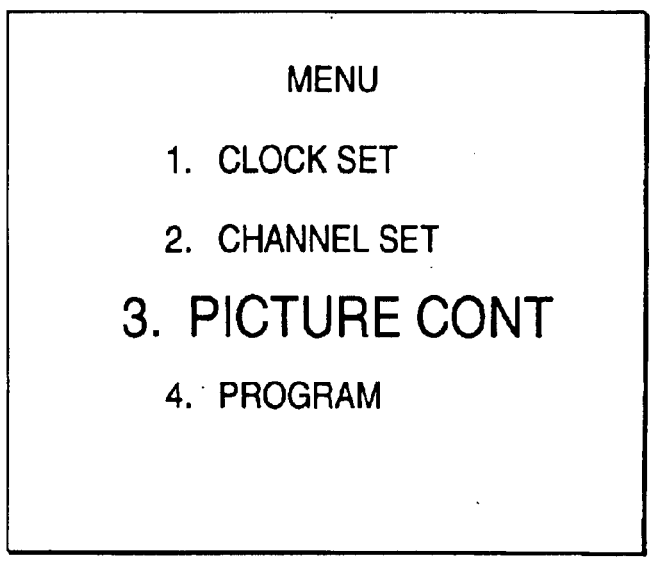
FIG. 5 is a diagram showing an example of a screen wherein letters of another menu item are displayed in an enlarged size in the embodiment.

In this state, when the up/down key 15 is pushed once, the letters of "2. CHANNEL SET" are restored in the normal size, and only the letters of "3. PICTURE CONT" are displayed in a double size as shown in FIG. 5. In this state, when the selection key 16 is pushed, the program processing of the PICTURE CONT (picture quality control) which is the menu item corresponding to the menu number "3" is executed.

In this manner, when the user performs the menu selection operation, since the size and shape of the display letters and the like of the selected menu item are changed, the user can clearly distinguish the selected menu item from the non-selected menu items. Accordingly, the selected menu item can be distinguished quite easily and the input operation can be performed easily, so that the operability of the apparatus can be improved. In the aforesaid embodiment, the menu numbers corresponding to the menu items are not necessarily displayed and may be omitted.

Next, a menu display apparatus according to another embodiment of the present invention will be described.

The menu display apparatus according to the another embodiment has the same circuit arrangement as that shown in FIG. 1 and is adapted to realize various menu displays by merely changing the contents of the command supplied from the microcomputer 9 to the OSD IC 13.

Examples of menu display in this embodiment will be described below.

When a user pushes the menu key 14 provided as the operation keys of the remote controller 12 (or the display panel 10), corresponding data is sent to the microcomputer 9. In response to the data, the microcomputer 9 shifts the operation mode to the menu selection mode and executes the program processing shown by the flow chart of FIG. 6.

Figure 7:
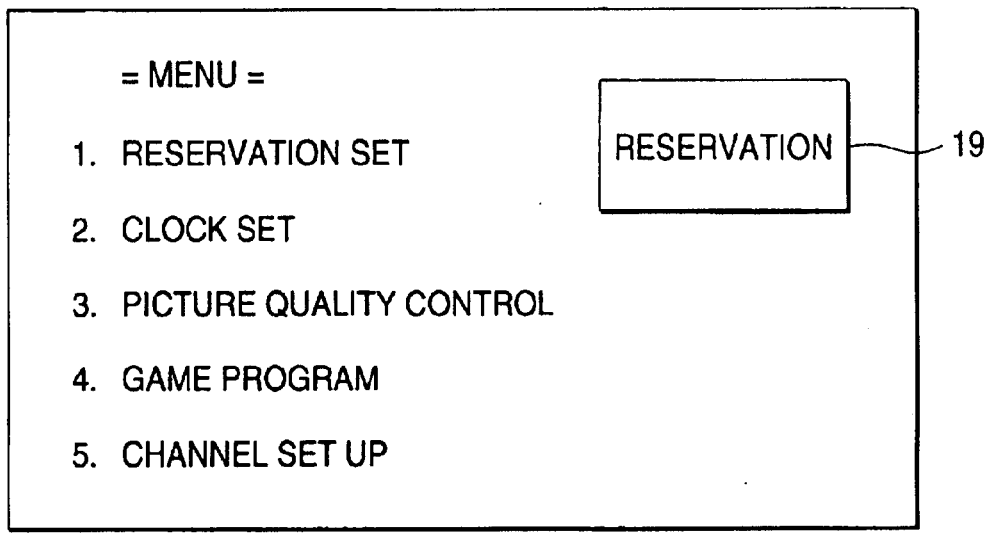
FIG. 7 is an explanatory diagram showing an initial menu scene displayed on a screen of the menu display apparatus according to the another embodiment.

First, the microcomputer 9 supplies the command to the OSD IC 13 thereby to display a menu scene (step S21). FIG. 7 shows an initial menu scene displayed on the screen of the CRT 5. In this case, as the menu items, there are "RESERVATION SET", "CLOCK SET", "PICTURE QUALITY CONTROL", "GAME PROGRAM" and "CHANNEL SET UP". Numbers "1" to "5" are assigned to these menu items as the menu numbers, respectively.

Thereafter, it is determined whether or not the up/down key 15 of the remote controller 12 (or the operation panel 10) has been pushed (step S22). If it is determined that the up/down key 15 has been pushed, the microcomputer 9 supplies the command to the OSD IC 13 thereby to cyclically change the letters indicating the menu item within the window 19 contained in the initial menu scene in a range of "RESERVTION", "CLOCK", "PICTURE QUALITY", "GAME" and "CHANNEL" (step S23). In this case, the large-sized letters indicating the menu item within the window 19 at the upper right portion of the screen are changed cyclically at every pushing of the up/down key 15 (step S24). That is, in the state where the "RESERVTION" is displayed as shown in FIG. 7, when the down key is pushed once, the letters within the window 19 are changed into "CLOCK". In contrast, when the up key is pushed once, the letters within the window 19 are changed into "CHANNEL".

The letters within the window 19 are generated by the OSD IC 13. The OSD IC 13 is adapted to output character data of abbreviated letters indicating the menu item or the initial letter of the menu item in accordance with the command from the microcomputer 9.

Subsequently, it is determined whether or not the selection key 16 of the remote controller 12 (or the operation panel 10) has been pushed (step S25).

Figure 6:
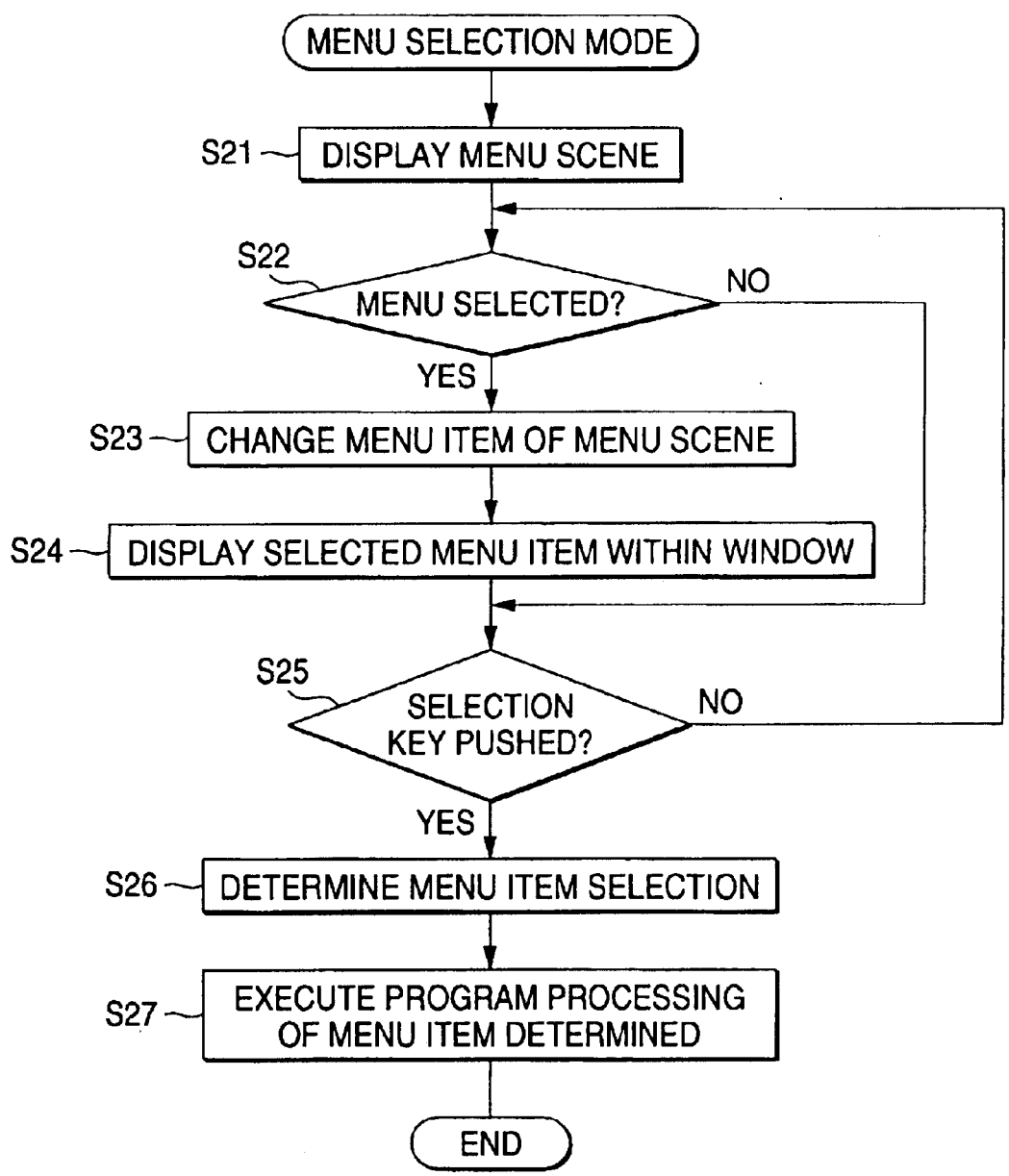
FIG. 6 is a flow chart for explaining the menu display operation of a menu display apparatus according to another embodiment.

When it is determined that the selection key 16 has not been pushed, the process returns to step S22. In contrast, when it is determined that the selection key 16 has been pushed, the selection of the menu item corresponding to the letters displayed within the window 19 of the menu scene at this time point is determined (step S26). Then, the menu selection mode is cancelled and the program processing shown in FIG. 6 is terminated. Thereafter, the program processing of the menu item thus determined in the menu selection is executed (step S27).

For example, when the up/down key is pushed once in a state where the initial menu scene is displayed on the screen of the CRT 5, only the letters of "RESERVATION" indicating the "RESERVATION SET" are displayed in an enlarged size within the window 19, as shown in FIG. 7. In this state, when the selection key 16 is pushed, the program processing of the reservation setting corresponding to this menu item is executed in the same manner as described above.

In contrast, when the up/down key is further pushed to the down direction without pushing the selection key 16, the letters of "CLOCK" indicating the "CLICK SET" are displayed within the window 19 instead of the letters of "RESERVATION".

When the selection key 16 is pushed in this state, the program processing for the clock setting which is the menu item selected at this time point is executed.

Preferably, the expressions such as symbols, pictures or the like which can be understood easily may be employed instead of the aforesaid letters "RESERVATION", "CLOCK", "PICTURE" and the like. Further, the letters of "CHANNENL SET UP" may be changed into the abbreviated expression of "CH SET UP". Such modifications can be realized by merely changing the contents of the command supplied from the microcomputer 9 to the OSD IC 13.

In this manner, when the user performs the selection operation of a menu item, the selected menu item is displayed in an enlarged size in the form of abbreviated letters indicating the selected menu item or the initial letter of the selected menu item. Accordingly, the contents of the selected menu item can be visually understood quite easily and hence the every input operation can be facilitated.

Supposing that the menu item of "RESERVATION SET" is selected and determined in the menu scene shown in FIG.

Figure 8:
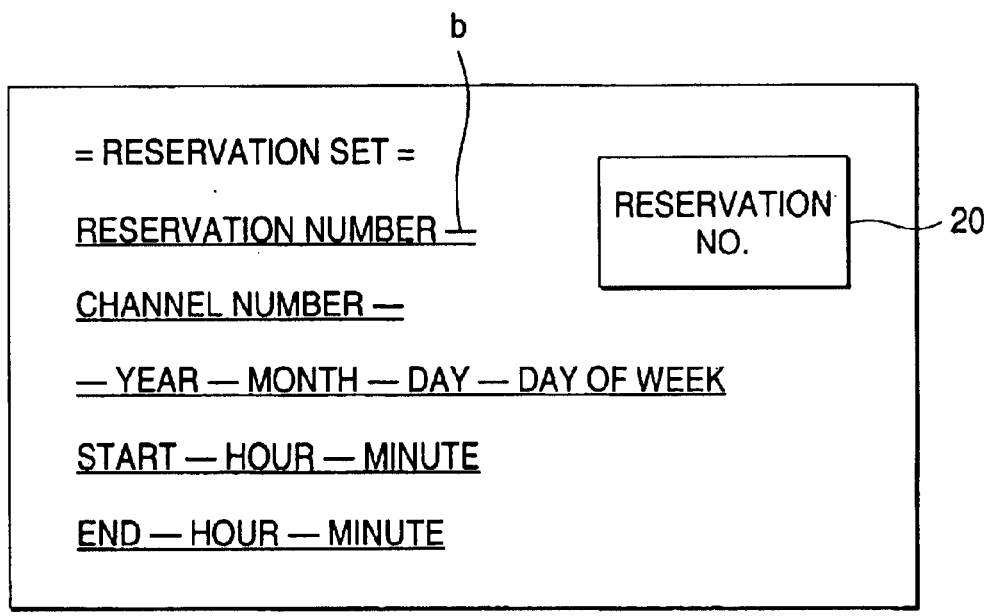
FIG. 8 is a diagram showing an example of a screen wherein letters indicating an input item are displayed in an enlarged size in the another embodiment.

7 and then the program processing for the reservation setting is executed, thereafter a menu scene for inputting a concrete numerical value is displayed as shown in FIG. 8. In this menu scene, the item in which a concrete numerical value is to be inputted can be displayed in an enlarged size in the following manner.

That is, in the initial state where the scene has been changed into the menu scene for inputting a concrete numerical value as shown in FIG. 8, the item at the uppermost position among a plurality of input items is displayed in an enlarged size in the form of abbreviated letters within a window 20 at the upper right position of the screen. In the example shown in FIG. 8, "RESERVATION NO." is displayed. Short bars b are displayed at the positions where numerical values to be inputted by the user a re displayed, like the conventional technique. The letters within the window 20 are changed in response to the operation of the up/down keys 15 like the aforesaid embodiment.

In other words, since the scene shown in FIG. 8 is in a state for urging the user to input a reservation number, when the user inputs an arbitrary numerical value (for example, "1") in this scene by using the numerical keys 18 of the remote controller 12, "1" is display ed at the position of the bar b adjacent to the "RESERVATION NUMBER".

In this case, since the numerical number is displayed at the position of the bar b, the selection of the input menu can be determined without pushing the selection key 16. Then, when the up/down key 15 is pushed once to the down direction, the letters within the window 20 are replaced by the letters "CH NO." and the input item in which a numerical value is to be inputted is changed into the "CHANNEL NUMBER".

Figure 9:
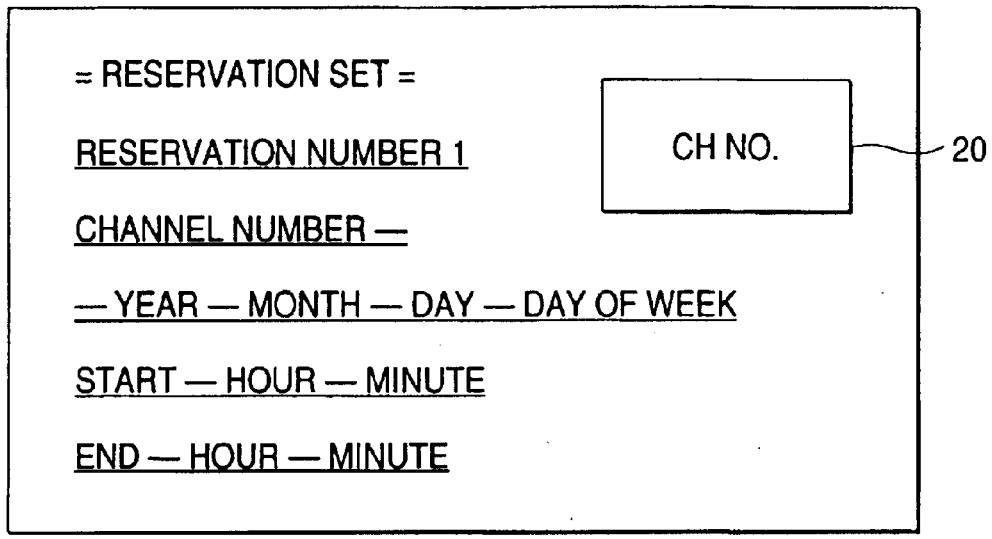
FIG. 9 is a diagram showing an example of a screen wherein letters indicating another input item are displayed in an enlarged size in the another embodiment.

Such a state is shown in FIG. 9. The scene shown in this figure is in a state for urging the user to input a channel number.

Figure 10:
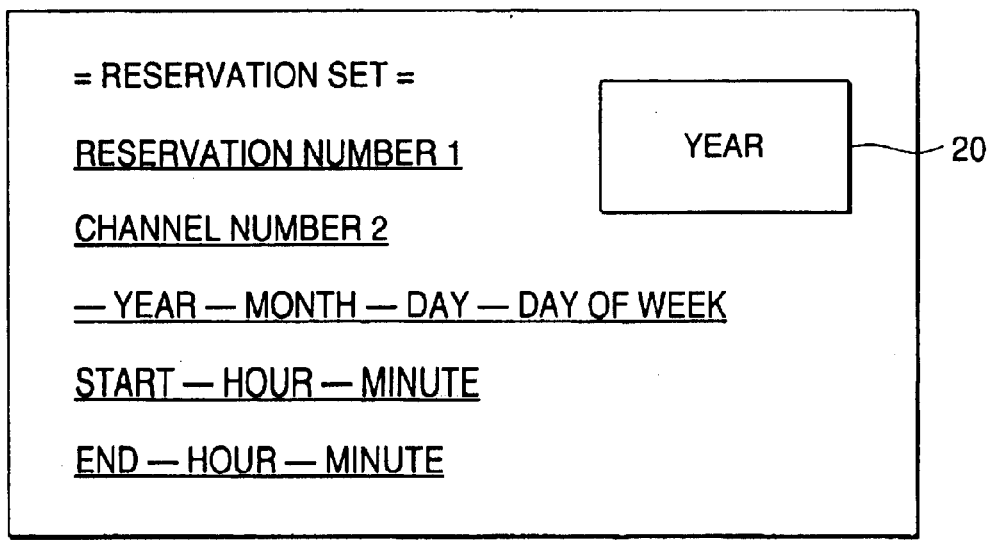
FIG. 10 is a diagram showing an example of a screen wherein letters indicating still another input item are displayed in an enlarged size in the another embodiment.

Thereafter, when the user inputs a channel number (for example, "2") in the same manner as described above, "2" is displayed at the position adjacent to the letters "CHANNELNUMBER". Subsequently, when the up/down key is further pushed once to the down direction, the letters within the window 20 are replaced by "YEAR" (see FIG. 10), so that a scene on the screen urges the user to input an year to be reserved.

Hereinafter, the start time and the end time of the recording reservation can be inputted in the same manner as described above in a visually easy manner in accordance with the enlarged letters serving as a guide.

The letters of the input item itself can be displayed in an enlarged size in the menu scene for inputting a numerical value as described below with reference to some examples.

That is, in the initial state where the scene has been changed into the scene for inputting a numerical value, the item at the uppermost position ("RESERVATION NUMBER" in FIG. 11) among the plurality of input items is displayed in the size larger than that of other input items. Short bars b are displayed at the positions where numerical values to be inputted by the user are displayed, like the conventional technique.

The scene shown in FIG. 11 is in a state for urging the user to input a reservation number. When the user inputs an arbitrary numerical value (for example, "1") in this scene by using the numerical keys 18 of the remote controller 12, "1" is displayed at the position adjacent to the "RESERVATION NUMBER".

Also in this case, since the numerical number is displayed at the position of the bar b, the selection of the input menu can be determined without pushing the selection key 16. Then, when the up/down key 15 is pushed once to the down direction, the letters of "RESERVATION NUMBER" are restored in the normal size and the letters of "CHANNEL NUMBER" are changed into an enlarged size instead thereof (see FIG. 12).

Such a state shown in FIG. 12 is a scene for urging the user to input a channel number.

In the same manner as described above, when the user inputs an arbitrary numerical value as the channel number, the inputted numerical value is displayed at the position adjacent to the letters of "CHANNEL NUMBER". Subsequently, when the up/down key is further pushed once to the down direction, the letters of "CHANNEL NUMBER" are restored in the normal size and simultaneously the letters of "YEAR" are displayed in an enlarged size. Accordingly, the user can input the date of the recording reservation by using the numerical keys 18.

Hereinafter, the start time and the end time of the recording reservation can be inputted in the same manner as described above in a easy manner in accordance with the enlarged letters serving as a guide.

What is claimed is:

1. A menu display apparatus comprising:

display means including internally controlled means for displaying a series of interactive menus for prompting a user to make a selection and/or enter data, each said interactive menu of the said series of interactive menus comprising:

a plurality of menu items within a predetermined field, each of the plurality of menu items being provided with an identifier and presented free of control of the user and in text characters of substantially common font type and size;

said plurality of menu items displayed on an initial menu scene display control means in each said menu for displaying the identifier corresponding to a selected menu item on a fixed portion of the viewing screen outside of the predetermined field, wherein the identifier corresponding to the identifier of the menu item selected by said selection means and displayed on the screen is displayed within a window, operation means for operating the display means including at least an up/down key and a selection key; and selection means for inputting data for selecting an arbitrary one of the series of interactive menus, or for selecting an arbitrary one of the plurality of menu items that are displayed by the series of interactive menus, whereby the selected menu item is selected by at least an operation of said up/down key causing a selected number to be displayed and clearly conveyed to the user and rendered visually distinguishable from non-selected menu items to thereby facilitate the input operation and improve the operability of the apparatus.

2. The menu display apparatus according to claim 1, wherein the identifier corresponding to the menu item selected by said selection means and displayed on the screen is displayed at a portion of the screen separated from a display position of the other of said plurality of menu items in a font size at least two times larger than that of the characters of the menu items.

3. The menu display apparatus according to claim 1, wherein the identifier corresponding to the menu item selected by said selection means and displayed on the screen is displayed at a corner position separated from a display position of the menu items in a size at least two times larger as that of the characters of the menu items.

4. The menu display apparatus according to claim 1, further comprising: determination means for inputting data for determining the selected menu item, and control means for executing a program processing corresponding to the determined menu item.

5. A menu display apparatus comprising:

display means including internally controlled means for displaying a series of interactive menus for prompting a user to make a selection and/or enter data, each said interactive menu of the series of interactive menus additionally comprising:

a plurality of menu items within a predetermined field, each of the plurality of menu items being presented free of control of the user and in text characters of substantially common font type and size, whereby the selected menu item is selected by at least one up/down key causing a selected number to be displayed; and display control means for displaying and changing at least one of the size, font type, or shape of the text characters of a selected menu item to clearly convey the selected menu item and to render the selected menu item visually distinguishable from non-selected menu items;

operation means for operating the display means including said at least one of said an up/down key and one selection key; and selection means including the selection key for inputting data for selecting an arbitrary one the series of interactive menus, or for selecting an arbitrary one of the plurality of menu items that are displayed.

6. The menu display apparatus according to claim 5, wherein the menu item selected by said selection means is displayed in a size at least two times as large as that of the display characters of the menu items not selected by said selection means.

7. The menu display apparatus according to claim 5, wherein the menu item selected by said selection means is displayed with characters thicker than the display characters of the menu items not selected by said selection means.

8. The menu display apparatus according to claim 5, further comprising: determination means for inputting data for determining the selected menu item, and control means for executing a program processing corresponding to the determined menu item.

9. A menu display apparatus comprising:

display means including internally controlled means for displaying a series of interactive menus for prompting a user to make a selection and/or enter data, each said interactive menu of the series of interactive menus comprising:

a plurality of menu items within a predetermined field presented free of control of the user and in text characters of substantially common font type and size;

display control means for displaying a sign on a portion of the viewing screen outside of the predetermined field and visually adjacent to a selected menu item that is larger than the text characters to clearly convey the selected menu item and to render the selected menu item visually distinguishable from non-selected menu items, wherein the sign corresponding to the menu item selected by a selection means and displayed on the screen is displayed within a window, said selection means being a selection means for inputting data for selecting an arbitrary one the series of interactive menus, or for selecting an arbitrary one of the plurality of menu items that are displayed;

means for operating said selection means including at least one up/down key and one selection key;

a plurality of menu items displayed on an initial menu scene, said menu items being selectable by said up/down key and displayed upon a selection; and an execution of said selection occurring immediately upon a movement of said selection key.

10. The menu display apparatus according to claim 9, wherein the sign corresponding to the menu item selected by said selection means displayed on the screen is displayed at a corner position separated from a display position of the menu items in a size at least twice as large as that of the characters of the menu items.

11. The menu display apparatus according to claim 9, wherein the sign is an initial one character of initial plural characters of the display characters indicating the menu item corresponding to the sign.

12. The menu display apparatus according to claim 9, wherein the sign is a one character or plural characters of a part of the display characters indicating the menu item corresponding to the sign.

13. The menu display apparatus according to claim 9, wherein the sign is an expression including a symbol, letter or picture.

14. The menu display apparatus according to claim 9, further comprising determination means for inputting data for determining the selected menu item, and control means for executing a program processing corresponding to the determined menu item.

* * * * *

UNITED STATES PATENT AND TRADEMARK OFFICE
CERTIFICATE OF CORRECTION

PATENT NO. : 6,876,397 B2 Page 1 of 1
DATED : April 5, 2005
INVENTOR(S) : Hideaki Funakoshi and Koshiro Itakura It is certified that error appears in the above-identified patent and that said Letters Patent is hereby corrected as shown below:

Column 8,
Line 43, after "within a window" add -- and for displaying and changing at least one of the size, font type, or shape of the text characters of a selected menu item to clearly convey the selected menu item and to render the selected menu item visually distinguishable from non-selected menu items --.

Column 10,
Line 12, after "within a window," add -- and for displaying and changing at least one of the size, font type, or shape of the text characters of a selected menu item to clearly convey the selected menu item and to render the selected menu item visually distinguishable from non-selected menu items --.

Signed and Sealed this

Thirteenth Day of September, 2005

JON W. DUDAS
*Director of the United States Patent and Trademark Office*